Nov. 19, 1957 J. N. LEONARD 2,813,726
VEHICLE SAFETY BELT MOUNTING DEVICE
Filed Feb. 20, 1956

INVENTOR.
JOHN N. LEONARD
BY Lyon & Lyon
ATTORNEYS

United States Patent Office 2,813,726
Patented Nov. 19, 1957

2,813,726

VEHICLE SAFETY BELT MOUNTING DEVICE

John Noel Leonard, Van Nuys, Calif., assignor to Auto-Ciat Manufacturing Co., Division of B-N Corporation, Los Angeles, Calif., a corporation of California Application February 20, 1956, Serial No. 566,605

1 Claim. (Cl. 280—150)

This invention relates to vehicle safety belt mounting devices, and included in the objects of this invention are:

First, to provide a mounting device which is readily and quickly mounted on the floor of a vehicle, such as a passenger automobile, and when mounted may be adjusted to grip tightly a safety belt.

Second, to provide a mounting device of this class wherein the belt is so held that the belt will break before slipping in the mounting device, the mounting device being so arranged that no stress concentrations are applied to the belt, and abrading or wearing of the belt in the region of attachment of the belt is avoided so that if tensional loads are placed on the belt, to exceed its elastic limit, the belt will not break at the mounting device.

Third, to provide a device of this class which does not require any special end fitting or loop on the belt secured therein, and which permits ready adjustment of the belt length.

With the above and other objects in view, as may appear hereinafter, reference is directed to the accompanying drawings in which.

Figure 1:
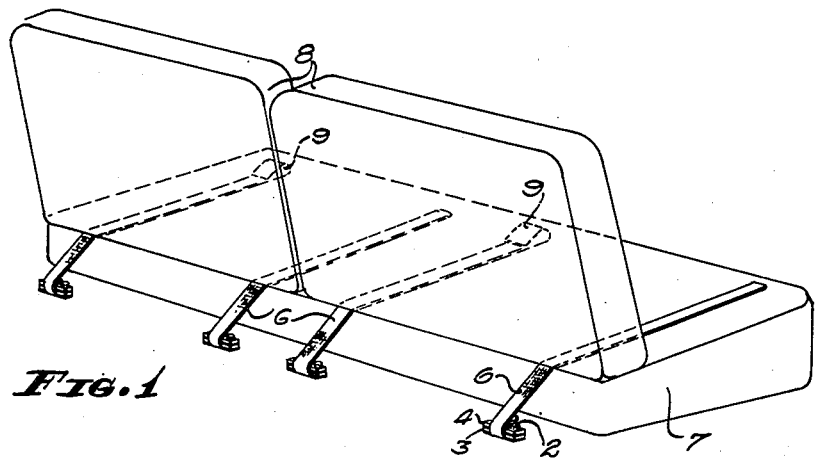
Figure 1 is a diagrammatical perspective view of a car seat, showing the manner of use of the vehicle safety belt mounting device.

The mounting device includes a flat, rectangular, reinforcing bar 1. The reinforcing bar 1 is provided with spaced screwthreaded holes which receive bolts 2. Slidably mounted on the bolts 2 is a lower clamp bar 3 and an upper clamp bar 4, each of these bars having a pair of spaced holes. Each clamp bar is also of rectangular cross-section with rounded corners.

The reinforcing bar 1 is adapted to be placed under the floor plate or panel 5 of a vehicle, such as a passenger car, in alignment with holes previously bored through the floor plate. The lower and upper clamp bars 3 and 4 as well as the bolts 2 are disposed at the upper side of the floor plate 5, the bolts extending downwardly through the floor plate and screwthreaded into the reinforcing bar. The bolts 2 are of sufficient length that they may be attached to the reinforcing bar 1 while allowing substantial sliding movement of the clamp bars 3 and 4.

Figure 2:
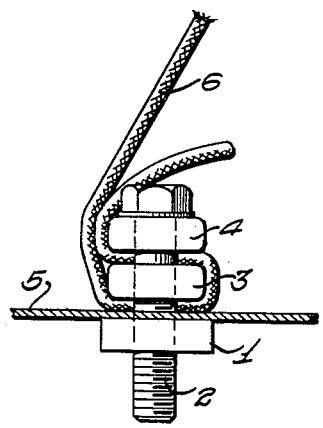
Fig. 2 is an enlarged end view of the mounting device shown attached to the floor panel of a vehicle, the floor panel being indicated in section.
Figure 3:
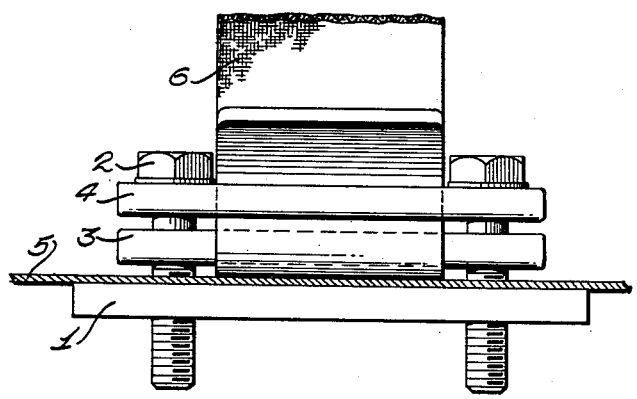
Fig. 3 is a side view thereof with the floor panel indicated in section.

The end of a safety belt 6 is inserted between the lower clamp bar 3 and the floor plate 5 in a direction toward the forward end of the car and then folded upwardly and backwardly between the two clamp bars 3 and 4. The bolts 2 are then tightened until the belt is firmly gripped by the clamp bars. The belt 6 is adapted to extend upwardly and forwardly from the clamp bars with the free end of the belt in an underlying position, as shown in Fig. 2.

The mounting device is preferably located a few inches rearwardly of the vehicle seat 7, as indicated in Fig. 1.

The safety belt 6 comprises two separate belt sections, the end of each section being attached to a mounting device, that is, a pair of mounting devices is employed for each belt. The belt sections extend forwardly and upwardly from the mounting device and pass between the seat 5 and the seat back 8, as indicated in Fig. 1.

One of the belt sections of the belt 6 is provided with a buckle 9. The two ends of the belt sections are joined together by the buckle when the safety belt is in use.

Figure 4:
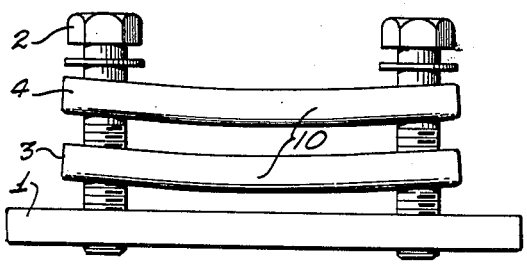
Fig. 4 is a side view of the mounting device before installation, indicating the normal bowed shape of the clamp bars.

As indicated in Fig. 4, the upper and lower clamp bars 3 and 4 are preferably bowed or warped, as indicated by 10, with their convex sides facing downward. Upon tightening the bolts 2, the clamp bars are forced to a substantially flat condition, so that the belt is firmly held throughout its width.

While a particular embodiment of this invention has been shown and described, it is not intended to limit the same to the exact details of the construction set forth, and it embraces such changes, modifications, and equivalents of the parts and their formation and arrangement as come within the purview of the appended claim.

I claim:

A safety belt and mounting for vehicles, comprising: a reinforcing bar having a pair of screwthreaded holes therein and adapted to be placed under a floor panel of a vehicle; a pair of bolts screwthreaded into said reinforcing bar from the top side of said floor panel; a pair of clamp bars slidable on said bolts; said clamp bars being longitudinally bowed with their convex sides facing toward said reinforcing bar; a belt adapted to be threaded under and between said clamp bars, whereby upon tightening said bolts said clamp bars are forced into a substantially straight condition whereby said belt is securely clamped by said clamp bars.

References Cited in the file of this patent

UNITED STATES PATENTS

| | | |
|---|---|---|
| 1,049,090 | Hoeft | Dec. 31, 1912 |
| 2,039,369 | Travani | May 5, 1936 |
| 2,204,121 | Coleman | June 11, 1940 |
| 2,365,625 | Carlisle | Dec. 19, 1944 |
| 2,548,993 | Mierzwa | Apr. 17, 1951 |

OTHER REFERENCES

"Ford Field" (periodical) Sept. 1954, vol. 56, No. 9; pages 16 and 34 only. Article by Thomas Howe on Safety Belts.